United States Patent [19]

Fujiwara et al.

[11] 4,374,977

[45] Feb. 22, 1983

[54] POLY-P-PHENYLENE-TEREPHTHALA-MIDE FIBERS EXCELLENT IN FATIGUE RESISTANCE AND PROCESS FOR PREPARATION THEREOF

[75] Inventors: Takashi Fujiwara, Miyazaki; Shuji Kajita, Osaka; Tetsuo Matsushita, Miyazaki; Seiichi Manabe, Osaka, all of Japan

[73] Assignee: Asahi Kasei Kogyo Kabushiki Kaisha, Japan

[21] Appl. No.: 129,403

[22] Filed: Mar. 11, 1980

[30] Foreign Application Priority Data

Mar. 13, 1979 [JP] Japan .................................... 54-29116

[51] Int. Cl.³ .............................................. C08G 69/46
[52] U.S. Cl. .................................... 528/348; 264/184; 528/481; 528/499
[58] Field of Search ........................................... 528/348

[56] References Cited

U.S. PATENT DOCUMENTS

| 3,227,793 | 1/1966 | Cipriani | 264/203 |
| 3,689,430 | 9/1972 | Yates | 252/309 |
| 3,767,756 | 10/1973 | Blades | 264/184 |
| 3,817,941 | 6/1974 | Bair et al. | 528/348 |
| 3,819,587 | 6/1974 | Kwolek | 57/140 R |
| 3,869,429 | 3/1975 | Blades | 264/203 |
| 3,869,430 | 3/1975 | Blades | 528/348 |
| 4,016,236 | 4/1977 | Nagasawa et al. | 264/184 |

OTHER PUBLICATIONS

English Translation of claims 1-3, Japanese Patent Application 143724/1976.
English Translation of claims 1-4, Japanese Patent Application 37473/1978.

*Primary Examiner*—Harold D. Anderson
*Attorney, Agent, or Firm*—Finnegan, Henderson, Farabow, Garrett & Dunner

[57] ABSTRACT

A poly-p-phenylene-terephthalamide fiber with excellent fatigue resistance resulting from a unique combination of properties. The fibers are prepared by extruding an anisotropic polymer dope in a non-coagulating layer, passing the extrudate through a coagulating layer, depositing the resulting coagulated fibers on a net conveyor, and in the absence of substantial tension sequentially washing the fibers, holding the fibers in saturated steam, and drying the fibers under specified conditions.

9 Claims, 5 Drawing Figures

POLY-P-PHENYLENE-TEREPHTHALAMIDE FIBERS EXCELLENT IN FATIGUE RESISTANCE AND PROCESS FOR PREPARATION THEREOF

BACKGROUND OF THE INVENTION

The present invention relates to improved poly-p-phenylene-terephthalamide (hereinafter referred to as "PPTA") fibers and a process for their preparation. More particularly, the invention relates to high tenacity, PPTA fibers showing excellent fatigue resistance when used for reinforcing plastics and rubbers, and a process for their preparation.

PPTA is a polymer that has been known for many years and, from the rigid molecular structure of this polymer, it has been expected that its fibers would have excellent heat resistance and mechanical properties. However, PPTA is only slightly soluble or insoluble in organic solvents. Accordingly, Cypriani proposed a basic process for wet-spinning PPTA by using concentrated sulfuric acid as a solvent (U.S. Pat. No. 3,227,793), but Cypriani's process itself was not industrialized.

It has been known for many years that when a rigid polymer is dissolved in a solvent, a liquid crystal is formed at a degree of polymerization exceeding a certain level and a concentration exceeding a certain level under a certain temperature condition, and this phenomenon has been confirmed theoretically and experimentally (P. J. Flory; Proc. Roy. Soc., A234, 73 (1956)). It is easily predicted that if a polymer solution that is in the form of a liquid crystal is optically anisotropic can be extruded from a nozzle and coagulated without disturbing orientation of the liquid crystal caused in the interior of the nozzle, fibers having high tenacity and high Young's modulus and comprising highly oriented molecular chains will be obtained. In fact, Kwoleck proposed a process for the wet spinning of a concentrated solution of an aromatic polyamide having a rigid and linear molecular structure that is in the form of a liquid crystal (U.S. Pat. No. 3,819,587), and this type of wet spinning process again attracted attention in the art.

Even if the process of Kwoleck is adopted, however, to obtain a valuable high strength and tenacity, the as-spun fibers should be subjected to heat treatment under tension. According to this heat treatment under tension, the tenacity is improved and the Young's modulus is increased, but the elongation is reduced. Accordingly, these fibers are not satisfactory in fatigue resistance when they are used for reinforcing rubber articles such as tires.

Blades proposed a process in which an optically anisotropic dope having an elevated concentration is extruded in the air and then wet-spun to form as-spun fibers having a high tenacity owing to a specific fine-structure in the as-spun state (U.S. Pat. Nos. 3,767,756 and 3,869,429), and Blades further taught that these fibers are suitable for reinforcing rubbers.

Some of the inventors of the present invention noted that, since Blades specified the fine-structure of the fiber only with respect to the crystalline region thereof, the desirable effect is not actually attained by the fine-structure specified by Blades and found that, even if the teachings of Blades are precisely traced, good reproduction in the relations between physical properties and the fine-structure specified by Blades cannot be obtained. Accordingly, some of the inventors of the present invention conducted research and found that it is not reasonable to note the crystalline region alone according to the position of Blades, and also, that the amorphous region should be taken into account in defining fibers having desirable properties. Based on this finding, research was further conducted on the relation of the fine-structure of not only the crystalline region, but also the amorphous region in PPTA fibers to the characteristics of the fibers. As a result, the concept of the present invention was formed.

The remainder of us conducted research on the relation between the fiber preparation process and the fiber characteristics, and have already proposed several processes for wet spinning of optically anisotropic dopes of rigid polymers having a linear structure, for example, a process in which an optically anisotropic dope of an aromatic polyamide is wet-spun, and water-washing finishing of the coagulated fibers is carried out in the absence of substantial tension. It was already disclosed that according to this process, reduction of elongation is prevented and fibers showing an excellent fatigue resistance when used for reinforcing rubbers can be provided (the non-heat-treatment process in U.S. Pat. No. 4,016,236).

PPTA, which is a typical instance of rigid and linear aromatic polyamides, is advantageous in that starting monomers having high quality are readily available and this polyamide can be used very easily on an industrial scale. Since PPTA is readily oriented and crystallized in preparing fibers from PPTA, fibers prepared according to the process disclosed in the non-heat-treatment process in U.S. Pat. No. 4,016,236 readily undergo changes of physical properties, such as reduction of elongation, when they are exposed to slight tension or heat at necessary steps for reinforcing rubbers, such as the adhesive treatment, rubber vulcanization and other post-treatment. It is presumed that the reason for this is probably that thermal setting of the fine-structure of fibers is insufficient in the above-mentioned process disclosed in the non-heat-treatment process in U.S. Pat. No. 4,016,236. In fact, when fibers prepared according to this process are used for reinforcing rubbers, no satisfactory results are obtained with respect to fatigue resistance.

Furthermore, a process for preparing thermally set fibers by conducting water washing, drying, and heat-treatment in the absence of tension was introduced in the heat-treatment process in U.S. Pat. No. 4,016,236. However, when this technique is applied to PPTA, it is very difficult to control the parameters of the fine-structure of fibers, such as the crystallite size, the degree of crystallinity, the degree of orientation of molecular chains in the crystalline region, and the degree of orientation of molecular chains in the amorphous region. Accordingly, although fibers prepared according to this process are substantially uniform in mechanical properties, such as elongation, tenacity, and Young's modulus, there is observed a considerable variation in the fatigue resistance when they are used for reinforcing rubbers.

Methods for preparing fibers excellent in fatigue resistance by improving PPTA fibers disclosed in U.S. Pat. No. 3,869,429, etc., while retaining excellent mechanical properties, such as high Young's modulus and high tenacity, are roughly divided into two types. More specifically, one type is based on the technique of changing the chemical structure and the other type is based on technique of changing the fine-structure of fibers without changing the chemical structure. As an instance of the former type, there was proposed a process in which improvements are attained by copolymerization (see, for example, Japanese Patent Application Laid-Open Specification 116322/74 and Yabuki et al, Sen-i Gakkai Shi, 34, T187 (1978)). This process, however, is fatally defective in that an increase of the manufacturing cost by the copolymerization step cannot be avoided when the process is worked on an industrial scale. The present invention belongs to the latter type and is based on the technique of changing the fine-structure of fibers. We succeeded in preparing PPTA fibers having a highly improved fatigue resistance by improving the preparation processes proposed in the past by us in U.S. Pat. No. 4,016,236.

SUMMARY OF THE INVENTION

More specifically, we conducted detailed research on the techniques of preparation of PPTA fibers and on theoretical clarifications of the parameters of the fine-structure of PPTA fibers, and to our great surprise, we found that in the process for preparing PPTA fibers, to obtain PPTA fibers having high tenacity, high Young's modulus, and excellent fatigue resistance, and which are excellent in stability against heat or tension, it is very important and significant to perform the steam treatment prior to drying and to carry out drying under specific conditions. It was also found that fibers prepared according to such process have unique fine-structure that cannot be attained by any of the above-mentioned known conventional processes and the above-mentioned excellent properties are manifested by virtue of this unique fine-structure.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, and in accordance with one fundamental aspect of the present invention, there is provided a fiber excellent in fatigue resistance, which consists essentially of poly-p-phenylene-terephthalamide wherein the tangential refractive index (TRIv) of the fiber by polarized light vibrating in the direction perpendicular to the fiber axis is in the range of from 0 to 0.07, the tangential refractive index (TRIp) of the fiber by polarized light vibrating in the direction parallel to the fiber axis is in the range of from −0.06 to −0.005, the central refractive index (Nvo) of the fiber by polarized light vibrating in the direction perpendicular to the fiber axis and the X-ray diffraction intensity ratio (RIX) are in the range satisfying the conditions of the formulae (1) through (4):

$$Nvo \geq -0.08 (RIX) + 1.672 \quad (1)$$

$$Nvo \leq 1.700 \quad (2)$$

$$RIX \geq 0.85 \quad (3)$$

$$RIX \leq 1.20 \quad (4)$$

and the apparent crystallite size (ACS in Å) of the fiber and the orientation angle (OA in degrees) of the fiber are in the range satisfying the conditions of the formulae (5) through (8):

$$OA \geq 0.04 (ACS) + 16 \quad (5)$$

$$OA \geq 2 (ACS) - 160 \quad (6)$$

$$OA \leq 0.04 (ACS) + 26 \quad (7)$$

$$OA \leq 2 (ACS) - 82 \quad (8)$$

In accordance with another fundamental aspect of the present invention, the above-mentioned fibers are prepared by a process comprising extruding an anisotropic dope of a polymer consisting essentially of poly-p-phenylene-terephthalamide in concentrated sulfuric acid having a concentration of at least 98% by weight in a non-coagulating layer, passing the extrudate through a coagulating layer, depositing the resulting coagulated fibers on a net conveyor, and in the absence of substantial tension sequentially washing the fibers to remove sulfuric acid, holding the fibers in saturated steam maintained at at least 100° C., and drying the fibers at a temperature in the range of from 120° C. to 450° C. for a time satisfying the following condition:

$$250 \leq (\text{temperature, °C.}) \times (\text{time, seconds})^{0.08} \leq 600.$$

The invention consists in the novel parts, constructions, arrangements, combinations and improvements shown and described. The accompanying drawings, which are incorporated in and constitute a part of this specification, illustrate the invention and, together with the description, serve to explain the principles of the invention.

BRIEF DESCRIPTION OF THE DRAWINGS

1a: non-coagulating layer,
1b: coagulating layer
2: spinneret,
3a, 3b, 3c: filaments
4: take-out roller,
5: guide roller,
6: turning conveyor,
7: treating conveyor,
8: washing device,
9: steam treating device,
10: drying device
11: winding device,
12: cover belt.

FIG. 4-(A) is a model diagram showing the cross-section of the fiber, and FIG. 4-(B) shows the interference fringe observed in the lateral direction when the fiber of the present invention examined by an interference microscope using polarized light vibrating in a direction perpendicular to the fiber axis, and the designated elements are as follows:

d: deviation of the interference fringe in the fiber at point S,

D: distance between parallel interference fringes of the background,
r: radius of the cross-section of the fiber,
$r_o$: center of the cross-section of the fiber,
$r_G$: periphery of the fiber,
S: optional point on the cross-section of the fiber,
S′, S″: periphery of the fiber corresponding to S,
t: thickness of the cross-section of the fiber measured along the direction of incident light at point S.

d: deviation of the interference fringes of the background,
D: distance between parallel interference fringes of the background,
r: radius of the cross-section of the fiber.

DESCRIPTION OF THE PREFERRED EMBODIMENTS

Reference will now be made in detail to the presently preferred embodiments of the invention, an example of which is illustrated in the accompanying drawings.

The fibers of the present invention have crystalline regions having a structure characterized in that the apparent crystallite size (ACS in Å) and the orientation angle (OA in degrees) are in the range satisfying conditions of the four formulae:

$$OA \geq 0.04 \, (ACS) + 16 \quad (5)$$

$$OA \geq 2 \, (ACS) - 160 \quad (6)$$

$$OA \leq 0.04 \, (ACS) + 26 \quad (7)$$

$$OA \leq 2 \, (ACS) - 82 \quad (8)$$

Figure 1:
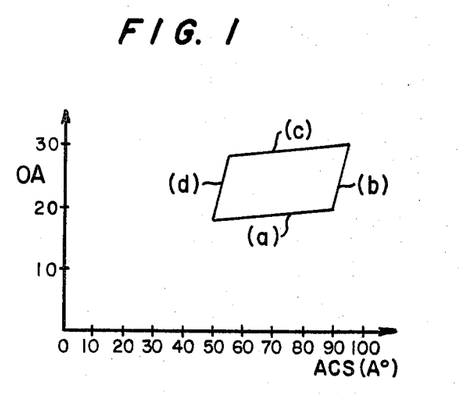
FIGS. 1 and 2 are diagrams illustrating the fine-structural characteristics of the fiber of the present invention, and in each of FIGS. 1 and 2, the fiber of the present invention is included in the region encompassed by four lines.

FIG. 1 has been prepared for illustrating this range intelligibly.

In FIG. 1, four lines (a), (b), (c), and (d) respectively correspond to the four formulae, respectively:

(a): $OA = 0.04 \, (ACS) + 16$ (b): $OA = 2 \, (ACS) - 160$ (c): $OA = 0.04 \, (ACS) + 26$ (d): $OA = 2 \, (ACS) - 82$

The fibers of the present invention having such specific fine-structure in crystalline regions are distinct over known fibers such as fibers disclosed in U.S. Pat. No. 3,869,429 and fibers marketed under the tradename "Kevlar" (fibers manufactured and sold by duPont; it is popularly said that they are PPTA fibers), in that the degree of orientation of molecular chains in the crystalline region is relatively low and the apparent crystallite size is relatively large. Moreover, the fibers of the present invention are distinct over fibers disclosed in U.S. Pat. No. 3,869,430 and fibers marketed under the tradename "Kevlar-49" (fibers manufactured and sold by duPont; it is believed that they are PPTA fibers) in that the degree of orientation of molecular chains in the crystalline region is considerably low. Furthermore, the fibers of the present invention are distinct over fibers prepared according to the process disclosed in the non-heat-treatment process in U.S. Pat. No. 4,016,236 in that the apparent crystallite size is relatively large.

The feature that the fibers of the present invention have a relatively low degree of orientation of molecular chains in the crystalline region is closely related to the fact that the washing and drying steps are conducted in the absence of substantial tension, and the wet heat treatment with steam is conducted in the absence of substantial tension after washing but before drying. Furthermore, the feature that the fibers of the present invention have a relatively large apparent crystallite size is closely related to the fact that specific conditions are selected for the drying operation to be conducted subsequently to the above-mentioned steam treatment. In the process disclosed in the heat-treatment process in U.S. Pat. No. 4,016,236, since a steam treatment in the absence of tension is not carried out prior to drying, the distortion of orientation of polymer molecular chains in the fiber is not sufficiently moderated, and, therefore, it often happens that the growth of crystal becomes excessive in the fiber or no substantial crystal growth is caused. Accordingly, according to this known method, it is very difficult to prepare fibers having an appropriate apparent crystallite size, as possessed by the fibers of the present invention, that is, a relatively large but not excessively large crystallite size.

It is indispensable for ensuring high tenacity, relatively large elongation, high Young's modulus, excellent dimensional stability, and excellent stability of physical properties under exposure to high temperatures and excellent fatigue resistance, that fibers should have a fine-structure defined by the above-mentioned 4 formulae (5) to (8) in the crystalline region; that is, a specific fine-structure in which a relatively low degree of orientation of molecular chains in the crystalline region is combined with a relatively large apparent crystallite size.

More specifically, in fibers failing to satisfy the requirement of the formula:

$$OA \geq 0.04 \, (ACS) + 16 \quad (5)$$

the orientation angle (OA) is excessively small, that is, the orientation angle of the molecular chain is too advanced in the crystalline region. In this case, both the tenacity and Young's modulus are at high levels, but the fatigue resistance is extremely low, and this is a fatal defect. It is preferred that the orientation angle be at least 20°, particularly at least 21°.

In fibers failing to satisfy the requirement of the formula:

$$OA \geq 2 \, (ACS) - 160, \quad (6)$$

the apparent crystallite size (ACS) is too large and, therefore, the tenacity is poor and also the fatigue resistance is, of course, degraded. In order to obtain fibers having a sufficient tenacity, it is preferred that the following requirement be satisfied:

$$OA \geq 2 \, (ACS) - 140.$$

Furthermore, in order to obtain the fibers having a particularly excellent fatigue resistance, it is especially preferred that the following requirement be satisfied:

$$OA \geq 2 \, (ACS) - 120.$$

Furthermore, in fibers failing to satisfy the requirement of the formula:

$$OA \leq 0.04 (ACS) + 26, \quad (7)$$

the orientation angle (OA) is too large. In other words, the degree of orientation of the molecular chains in the crystalline regions is too low. Accordingly, the fibers have a defect that the tenacity and Young's modulus are low, though the fatigue resistance is good.

Furthermore, in fibers failing to satisfy the requirement of the formula:

$$OA \leq 2 (ACS) - 82, \quad (8)$$

the apparent crystallite size (ACS) is too small and the crystallinity is low. These fibers are inferior to the fibers of the present invention in the Young's modulus and fatigue resistance, and they are defective in that, when they are exposed to high temperatures, for example, about 200° C., dimensional shrinkage is caused and reduction of the elongation is caused when exposed to high temperatures under tension. To obtain fibers free of such defects, it is preferred that the apparent crystallite size (ACS) be in the range defined by the formula:

$$OA \leq 2 (ACS) - 86$$

particularly the formula:

$$OA \leq 2 (ACS) - 90.$$

It is said that fibers manufactured on an industrial scale and now marketed under the tradename "Kevlar," by duPont, are PPTA fibers, and though the apparent crystallite size and orientation angle of the fibers vary to some extent among lots, it was found in products obtained by the inventors of the present invention that the apparent crystallite size is in the range of from 40 Å to 47 Å and the orientation angle is in the range of from 10° to 17°. It is considered that these commercial fibers are intended to be used for reinforcing rubbers, for example, as tire cords.

The fibers of the present invention have a fatigue-resistant life at least about three times that of Kevlar fibers (under the Goodyear tube fatigue test method) when a comparison is made under the same conditions (monofilament denier, filament number, and cord structure). From this experimental result, it will readily be understood that the fibers of the present invention are highly improved over the conventional fibers.

The reason the fibers of the present invention have such improved fatigue resistance, although they retain a relatively high degree of crystallinity, or the reason they have high tenacity and high Young's modulus, although the degree of orientation of molecular chains in the crystalline region is relatively low, cannot be sufficiently explained only by OA and ACS, which are parameters reflecting the fine-structure of crystalline regions. To clarify the above reasons sufficiently and completely, not only these two parameters but also other parameters reflecting the fine-structure of the polymer chain in amorphous regions should be taken into account.

As such parameters characterizing the fibers of the present invention, there can be mentioned the X-ray diffraction intensity ratio (RIX) as the generic parameter concerning the size and the orientation of the molecular chain of the crystalline region, the specific central refractive index (Nvo) of the fibers by polarized light vibrating in the direction perpendicular to the fiber axis, which is connected with the X-ray diffraction intensity ratio, and two specific tangential refractive indexes (TRIv and TRIp). More specifically, the fibers of the present invention are characterized in that the refractive index (Nvo) in the central portion of the fiber by polarized light vibrating in the direction perpendicular to the fiber axis and the X-ray diffraction intensity ratio (RIX) as the parameter of the crystalline regions satisfy conditions represented by the following formula:

$$Nvo \geq -0.08 (RIX) + 1.672 \quad (1)$$

$$Nvo \leq 1.700 \quad (2)$$

$$RIX \geq 0.85 \quad (3)$$

$$RIX \leq 1.2 \quad (4).$$

Figure 2:
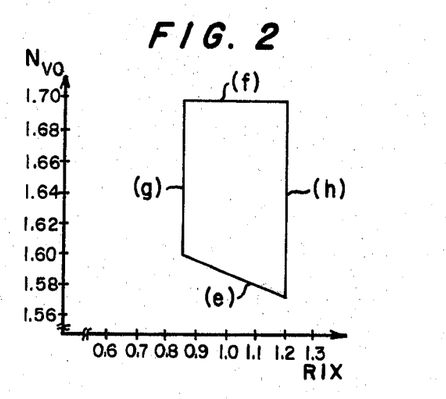

FIG. 2 is presented for illustrating these conditions intelligibly. In FIG. 2, lines (e), (f), (g), and (h) respectively correspond to the four formulae:

(e): $Nvo = -0.08 (RIX) + 1.672$ (f): $Nvo = 1.700$ (g): $RIX = 0.85$ (h): $RIX = 1.20$

It is very difficult to prepare fibers satisfying the condition of the formula (1) from the known techniques. The reason for this is that, although the Nvo value is considered to depend on the degrees of orientation of polymer chains (especially molecular chain axes) in crystalline and amorphous regions and the degrees of radial orientation of specific axes perpendicular to the molecular axis (especially the crystallographic axis b), in PPTA fibers the Nvo value is considered to be a certain inherent value determined by the chemical structure and it is considered that the absolute value of Nvo will not be changed to any significant extent. In fact, in fibers disclosed in U.S. Pat. No. 3,869,429, the molecular chains in crystalline regions are oriented to the very utmost extent in the direction of the fiber axis and the variation of the Nvo value is small. In this case, theoretically, the Nvo value should be in the range of from 1.62 (the crystallographic axis b is random in the radial direction) to 1.51 (the crystallographic axis b is completely oriented in the radial direction). Incidentally, $N\alpha = 1.5138$, $N\beta = 1.733$ and $N\gamma = 2.04$ have been adopted for the illustration as theoretical values of the main refractive index (see Yabuki et al., Sen-i Gakkai Shi, 32, T55 (1976); it should be noted here that the actual measurement of Np described below, made by the inventors of the present invention, indicated that $N\gamma$ was 2.07 or larger). In commercially available PPTA fibers (Kevlar and Kevlar-49) and fibers prepared according to the process disclosed in U.S. Pat. No. 3,869,429, the Nvo value is less than 1.585 or the RIX value is less than 0.85. In other words, crystals in the crystalline region are not sufficiently perfect, or/and the fiber has excessively large degree of orientation of b axis in the radial direction.

Fibers satisfying the condition of the formula (1) are realized by the fiber preparation process in which the washing and drying steps are conducted in the absence of tension, and fulfillment of this condition is closely related to the characteristic that the fatigue resistance is excellent. This preferred characteristic is prominent when the Nvo value is at least 1.605, and the excellent fatigue resistance is especially conspicuous when the Nvo value is at least 1.610.

It is construed that the fibers of the present invention characterized by the conditions of the formula (1) through (4) have a specific fine-structure in which the degree of orientation in the radial direction is relatively low in either the crystallographic axis b or the axis corresponding to the crystallographic axis b in the amorphous region; the amorphous region consists of molecular chains which take a stable conformation with respect to potential energy; the crystalline region has a relatively high degree of crystallinity; and the crystal is rather highly perfect. It is considered that such characteristics of molecular chains in the amorphous region contribute to the realization of an excellent fatigue resistance and excellent stability of the dimensional and physical properties under exposure to high temperatures.

When the condition of the formula (2), that is, Nvo≦1.700, is not satisfied, the tenacity and Young's modulus of the fibers are drastically reduced. Generally, as the Nvo value is increased, both the tenacity and Young's modulus tend to decrease and this tendency is enhanced with the line of Nvo=1.700 being the critical boundary. The preferred Young's modulus is realized if the condition of Nvo≦1.630 is satisfied.

Fibers satisfying the conditions of the formula (3) are characterized by a relatively high degree of crystallinity and a high perfectness of the crystal. Fibers prepared according to the process disclosed in the non-heat-treatment process in U.S. Pat. No. 4,016,236 have a low degree of crystallinity and insufficient crystal perfectness characterized by RIX≦0.85. Accordingly, the fibers are poor in stability of the dimensional or physical properties at high temperatures. A preferred value of RIX is 0.90 or larger. Fibers having a relatively high degree of crystallinity and good crystal perfectness characterized by RIX≧0.85 are conveniently prepared according to the process in which the steam treatment is carried out in the absence of tension, and drying is then conducted under specific conditions.

According to this unique process, the RIX value can be maintained in the range defined by the formula (4), that is, RIX≦1.20, and, therefore, occurrence of undesirable phenomena, such as excessive elevation of crystal degree of crystallinity, excessive increase of crystal perfectness and resulting drastic reduction of strength or fatigue resistance, can be effectively avoided. It is preferred that the RIX value be 1.05 or less. In this case, fibers are particularly excellent in fatigue resistance.

Theoretically, the physical significance of RIX is not completely clear, but the relation of RIX to physical values (particularly Young's modulus and fatigue resistance) is closer than the relation of ACS to physical properties. The inventors of the present invention understand that RIX is a parameter reflecting the anisotropy of the crystal growth direction, the anisotropy of the distribution density of defects, the conformation of the molecular chain in the crystalline region, and the variation of the packing state of the molecular chain, for example, crystal structures I and II proposed by Takayanagi et al., Polymer Preprints, Japan 26 (1977). The RIX value is ordinarily increased by the heat treatment, and it is considered that this increase of the RIX value is due to the fact that the RIX value reflects the above-mentioned complex changes of structure.

The fibers of the present invention can be observed by an interference microscope utilizing polarized light vibrating in the direction parallel to the fiber axis (in this case refractive index is referred to as Np) by using as a medium a mixture comprising 8 parts by weight of yellow phosphrous, 1 part by weight of methylene iodide, and 1 part by weight of sulfur according to the method adopted for determination of Nvo and TRIv, which will be described hereinafter.

It is interpreted that the thus measured Np value is a parameter reflecting the orientation of polymer chains in both the crystalline region and the amorphous region. It was found that the Np value of the fibers of the present invention is unique. More specifically, the Npo value, that is, the Np value in the center of the fiber and TRIp, the tangential value of the Np value in the cross-sectional direction of the fiber, are in specific ranges. Concretely, in the fibers of the present invention, the Npo value is at least 2.11, preferably at least 2.12. In contrast, in known fibers or fibers prepared according to known processes, the Npo value is at most 2.10. The reason for this is considered to be that in the fibers of the present invention, the degree of orientation of the molecular chain in the central portion of the fiber is higher than in commercially available PPTA fibers such as Kevlar and Kevlar-49. This is one of the characteristics distinguishing the fibers of the present invention from known fibers. As another parameter of the fine-structure, by which the fibers of the present invention can be distinguished more clearly from known PPTA fibers (such as fibers disclosed in U.S. Pat. No. 3,869,429 and Kevlar and Kevlar-49 fibers), there can be mentioned TRIp. More specifically, it has been confirmed that the fibers of the present invention have a negative TRIp value, while known PPTA fibers have ordinarily a positive TRIp value or a TRIp value of zero. From these TRIp values, it is inferred that in the fibers of the present invention, the degree of orientation of the polymer chains in the central portion of the fiber is relatively high. It was found that this characteristic of the fibers of the present invention with respect to the fine-structure is closely related to an excellent fatigue resistance in the fibers of the present invention. The fatigue resistance is further improved when the TRIp value is in the range of from −0.060 to −0.005, particularly from −0.040 to −0.010.

Figure 5A:
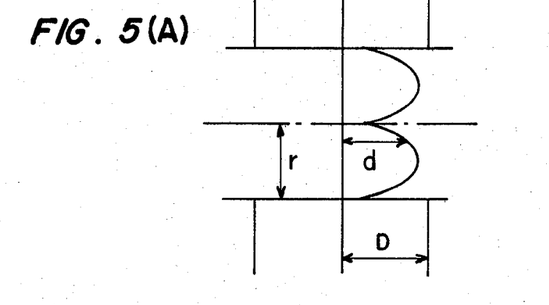
FIG. 5 shows interference fringes observed when PPTA fibers were examined from the lateral direction by an interference microscope using polarized light vibrating in the direction parallel to the fiber axis, in which (A) and (B) show interference fringes of known fibers (Kevlar-49 and Kevlar), (c) shows interference fringes of the fiber of the present invention (Example 1), and the designated elements are as follows.
Figure 5B:
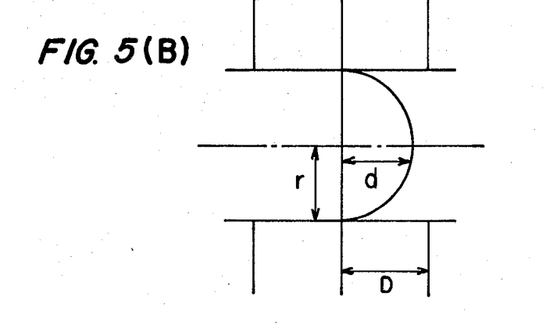
Figure 5C:
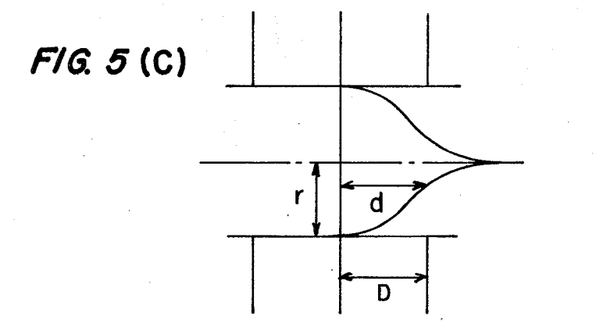

The difference of the fibers of the present invention over the known fibers in this point will be more apparent from FIG. 5. FIG. 5 is a model diagram showing interference fringes observed when fibers are examined from the lateral direction by an interference microscope using polarized light vibrating in the direction parallel to the fiber axis. FIG. 5-(A) shows interference bands observed in the case of fibers disclosed in U.S. Pat. No. 3,869,430 or Kevlar-49 fibers, and the interference fringes are characterized in that they are W-shaped and TRIp values are positive values. FIG. 5-(B) shows interference fringes observed in the case of fibers disclosed in U.S. Pat. No. 3,869,429 and the non-heat-treated PPTA fibers in U.S. Pat. No. 4,016,236 and Kevlar fibers, which are characterized that they are U-shaped (in a strict sense, ellipsoidal shape) and TRIp values are substantially zero. FIG. 5-(C) shows interference fringes observed in the case of the fibers of the present invention. It is seen that the interference fringes are V-like-shaped, and TRIp values are negative values.

If the direction of the axis of the molecular chain is completely in agreement with the direction of the fiber axis, the degree of orientation of the crystallographic axis b and the axis corresponding to the crystallographic axis b in the amorphous region with respect to the radial direction may be represented by the tangent (TRIv) of the Nv value along the radial direction. In U.S. Pat. No. 3,869,429, such orientation in the radial direction is expressed as a parameter of the LCO value and it is disclosed that fibers having a high LCO value, that is, a high degree of orientation in the radial direction, have preferred physical properties. However, adoption of the parameter of the LCO value involves a problem of the measurement principle or technique, that is, the variation is great because the LCO value is one determined with respect to a very limited region of the fiber (an area of less than $10^{-7}$ cm$^2$). Moreover, the LCO value is a parameter which relates only to orientation in the crystalline region. Therefore, this value has no substantial correlation to physical properties.

On the other hand, the TRIv value used by us can represent the degree of radial orientation in both the crystalline region and the amorphous region with high precision. However, as a result of detailed examination, it was found that the TRIv value, that is, the degree of radial orientation, has only a remote correlation to physical properties (such as tenacity, Young's modulus and fatigue resistance) of the fiber and that the TRIv value exceeding 0.07 results in reduction of elongation and fatigue resistance contrary to the teaching of U.S. Pat. No. 3,869,429.

In preparing fibers from an anisotropic dope, it is not preferred to advance coagulation while subjecting fibers to substantial elongation, because the aggregation structure or higher order fine-structure in the fiber tends to change to disordered structure. As such coagulation method, there can be mentioned a method in which a spinneret is immersed in a coagulating layer and a dope is spun from this spinneret. When fibers obtained by this method are observed by an interference microscope, it is seen that the aggregation structure or higher order fine-structure is disordered in the fibers. Furthermore, when these fibers are observed by a polarizing microscope, it is seen that grains having a size of about 1 μm are formed in the interior of the fiber and it is interpreted that this structure is comprised of a continuity of grains of the liquid crystal. From the report of Takayanagi et al., (Polymer Preprints, Japan 26 (1977)), it is apparent that a polymer having a very high polarity, such as the PPTA of the present invention, is coagulated with a specific crystal orientation to the interface. Therefore, since PPTA fibers retaining the inherent higher order fine-structure in the non-disordered state show an orientation of b axis to the fiber surface, that is, the radial orientation of a given crystal axis, when an immersing liquid medium having a refractive index substantially equal to that of the fibers is adopted and the fibers are observed by an interference microscope, a special interference fringe, such as the one shown in FIG. 4, can be seen. Such interference fringe is sufficiently manifested if destruction by elongation of the coagulated surface or opacification by heterogeneous coagulation is not caused at the coagulating step or after the coagulation, and manifestation of the interference fringe is not substantially influenced by the polymer concentration in the dope or like factors. As means capable of producing such preferred coagulation, there can be mentioned a spinning method in which a spinneret is separated from a coagulating layer and the tension for orientation is concentrated to a dope stream which is still in the non-coagulated state and is passing through a non-coagulating layer. In contrast, when there is adopted the above-mentioned method in which the dope is spun from a spinneret immersed in a coagulating layer and tension is applied for elongation at the coagulating step, opacification is caused in the spun fibers or no continuous interference fringe can be observed. This apparently indicates the presence of a heterogeneous aggregation structure. Fibers having such heterogeneous aggregation structure are poor in both tenacity and elongation.

TRIv is a parameter for quantitative determination of the pattern of the interference fringe observed by an interference microscope. In fibers having a disordered aggregation structure, no clear interference fringe can be measured. In contrast, the fibers of the present invention are characterized by a TRIv value of from 0 to 0.07, and from the practical viewpoint, a TRIv value of from 0.02 to 0.06 is preferred because good results are obtained with respect to tenacity, elongation and fatigue resistance. Fibers having such a TRIv value can easily be prepared according to the process of the present invention.

Incidentally, the TRIv value tends to increase if the drying factor value described hereinafter is increased or the draft at the spinning step is increased.

In the fibers of the present invention, it is preferred that the dynamic mechanical loss tangent (tan δ), as determined at a temperature of 30° C. and a relative humidity of 60%, be in the range of from 0.001 to 0.030. In fibers having a dynamic mechanical loss tangent larger than 0.030, the ratio of the amorphous region is excessively high and the dimensional stability is poor or the moisture absorbing property becomes conspicuous. Accordingly, in some application fields, disadvantages are caused by the use of such fibers. In fibers having a dynamic mechanical loss tangent (tan δ) smaller than 0.001, the degree of crystallinity is too high and mechanical properties of the fibers are degraded. The tan δ value measured at the above-mentioned temperature varies depending on the amounts of water and solvent incorporated. Ordinarily, this value is increased by an increase in the amount of impurities and solvent incorporated.

If the size of the monofilament constituting the fiber of the present invention is too large, there is observed a reduction of the tenacity or the like, which is considered to be due to flow orientation or coagulation speed at the spinning step. Accordingly, too large a size is not preferred and a fineness of several denier or less is ordinarily adopted. Generally, to obtain the intended high fatigue resistance, it is preferred that the monofilament denier be no more than about 3.0. The lower limit is not particularly critical, but a minimum monofilament denier ordinarily attainable industrially, that is, a monofilament denier of about 0.1, may be adopted as the lower limit.

By a "polymer consisting essentially of poly-p-phenylene-terephthalamide (hereinafter referred to as "PPTA")," which constitutes the fiber of the present invention, a polymer derived from terephthalic acid and p-phenylenediamine, each having an industrial purity, is meant. Preferably, this polymer is prepared according to a so-called low temperature solution polymerization method in which a polymer is formed from terephthaloyl chloride and p-phenylenediamine in an N-alkyl substituted carbonamide type solvent or a mixture of two or more of such solvents or in a mixture of such solvent with lithium chloride or calcium chloride (see, for example, U.S. Pat. No. 3,063,966).

In preparation of fibers of the present invention, to realize high tenacity or high fatigue resistance, it is ordinarily preferred to use a polymer having a high degree of polymerization. More specifically, it is preferred to use a polymer having an inherent viscosity of at least 5.0 dl/g, particularly at least 5.5 dl/g, as measured under conditions described hereinafter. Incidentally, the degree of polymerization of the polymer is sometimes reduced in the process starting with the step of dissolving the polymer in concentrated sulfuric acid and ending with the spinning step. Accordingly, it is desired to use a polymer having an inherent viscosity slightly higher than the desired inherent viscosity of the fiber. More specifically, it is preferred to use a polymer having an inherent viscosity higher by 0.1 to 0.5 dl/g than the desired inherent viscosity of the fiber, though the value differs to some extent depending on the temperature control and residence time at the dissolving step and subsequent step. The upper limit of the inherent viscosity is not particularly critical.

However, from the viewpoint of the viscosity of the spinning dope, it is preferred that the inherent viscosity of the polymer be less than about 10 dl/g.

The process for the preparation of the fibers of the present invention will now be described.

At first, the above-mentioned polymer is dissolved in concentrated sulfuric acid and the resulting spinning dope is passed through a non-coagulating layer and then through a coagulating layer to coagulate the spun dope in the fibrous form.

From the viewpoints of the dissolving power and the price, concentrated sulfuric acid is preferred as the polymer-dissolving solvent. In order to dissolve PPTA having the above-mentioned high inherent viscosity at a high concentration, concentrated sulfuric acid having a concentration of at least about 98% by weight is employed. Use of so-called fuming sulfuric acid containing free $SO_3$ is not preferred because $SO_3$ rather reduces the dissolving power and there is a possibility of sulfonation of the polymer by $SO_3$. The upper limit of the concentration of sulfuric acid is ordinarily 100% by weight.

The concentration of the polymer to be contained in the spinning dope is not particularly critical. For economical reasons and to maintain good mechanical properties, especially a high tensile strength, in the resulting fibers, it is preferred that the polymer concentration in the spinning dope be at least 12% by weight, particularly at least 14% by weight. The upper limit of the polymer concentration is not particularly critical. However, at too high a polymer concentration, stable spinning becomes impossible. Accordingly, the polymer concentration is ordinarily adjusted to about 20% by weight or lower. In order to improve the fatigue resistance so that fibers can be used effectively for reinforcing rubbers and the like, it is preferred that the polymer concentration be adjusted to 19% by weight or lower.

The dope that is used in the present invention should be anisotropic at least at a temperature at which it is extruded from the spinneret. This condition is indispensable for realizing preferred mechanical properties in the resulting fibers. Whether the dope is anisotropic or not can be determined according to, for example, the optical method disclosed in U.S. Pat. No. 3,819,587.

When the spinning dope is prepared and used, since the dope is sometimes solidified at a temperature approximating room temperature if the polymer concentration is maintained in the above-mentioned range of from 12 to 20% by weight, the dope is handled at a temperature ranging from room temperature to about 80° C. However, to avoid decomposition of the polymer as much as possible, a temperature as low as possible should be chosen.

The spinning dope is first extruded into a non-coagulating layer from the spinneret and then introduced to a coagulating layer. A gas, such as air or nitrogen, or a non-coagulating liquid, such as toluene or heptane, is used for the non-coagulating layer. From the viewpoint of ease of carrying out the spinning operation and from the economical viewpoint, the use of gas is preferred and air is most preferred. Incidentally, a vapor of a coagulating liquid (for example, water or methanol) may be contained at the saturated or unsaturated state in the gas.

The thickness of the non-coagulating layer is ordinarily about 0.1 to about 10 cm, and preferably 0.3 to 2 cm. When the thickness of the non-coagulating layer is too large, the spinning dope included in the scope of the present invention exhibits a so-called thixotropic viscosity characteristic. More specifically, the apparent viscosity is reduced with an increase of the deformation velocity, and therefore, the resulting fibers are not uniform in the size of cross-section, resulting in a reduction of tensile strength and elongation. If the thickness of the non-coagulating layer is too small, the obtained results are not substantially different from the results obtained when the spinning face of the spinneret is immersed in a coagulating bath. When the process of the present invention in which a non-coagulating layer is interposed between the spinning surface of the spinneret and the coagulating layer is adopted, there can be attained an advantage that since take-up drafting (stretching) is imposed on a stream of the dope in the non-coagulating layer and stretching is not or hardly imposed on fibers being solidified or already solidified in the coagulating layer, destruction or cracking of the fine-structure or further micro-cracking is not caused. This characteristic is related to the fact that the fibers of the present invention are not opacified or they have a specific tangential refractive index (TRIv). The fibers of the present invention can be distinguised by such characteristic of the fine-structure from fibers obtained by the wet spinning process in which the spinning dope is extruded from the spinning surface of the spinneret immersed in the coagulating layer.

Another advantage of the spinning process of the present invention is that, when a gas is selected for the non-coagulating layer, the temperature of the coagulating layer can be freely set independently from the temperature of the dope at the spinneret. Since the dope that is used in the present invention is sometimes solidified at a temperature approximating room temperature, it is often necessary to use a temperature higher than room temperature as the dope temperature. In this case, the coagulating layer can be maintained at room temperature or a lower temperature independently from the dope temperature. This advantage is important and significant from an industrial viewpoint.

Still another advantage of the spinning process of the present invention is that the draft (the ratio of the take-up velocity of coagulated fibers to the velocity of extrusion of the dope from the spinneret) can be increased over the draft attainable in the conventional wet spinning process using the spinneret immersed in the coagulating layer. By virtue of this advantage, it is possible to prepare fibers having highly improved tenacity and Young's modulus.

The configuration and size of the spinneret to be used for spinning are not particularly critical, but use of very small spinning holes should be avoided so as to prevent clogging and use of excessively large spinning holes should be avoided from the viewpoints of the extrusion linear velocity and shearing orientation. Ordinarily, the diameter of the spinning holes is chosen in the range of from 0.06 to 0.09 mm according to the spinning velocity and the intended monofilament denier.

The kind of the coagulating layer is not particularly critical, but a coagulating layer of water of sulfuric acid having a concentration lower than 50% by weight (aqueous solution of sulfuric acid) is preferred. The bath temperature of the coagulating layer is also not particularly critical. However, to prevent corrosion of the equipment material by dilute sulfuric acid, the bath temperature is preferably in the range of from room temperature to a temperature approximating the freezing point of the coagulating layer.

Figure 3:
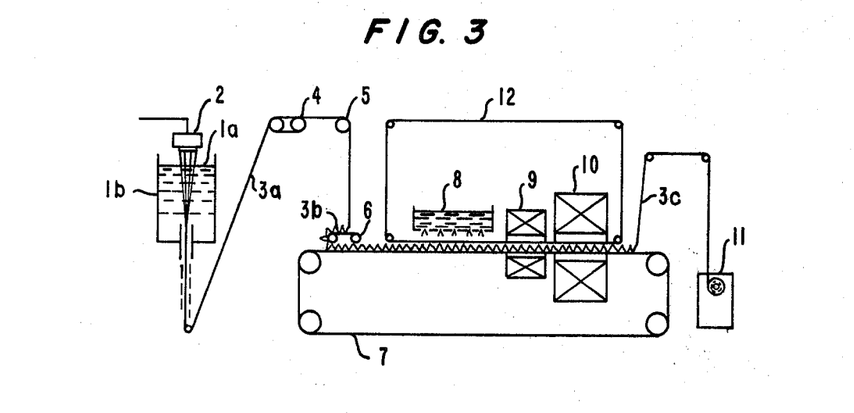
FIG. 3 is a diagram illustrating one embodiment of the process for preparing fibers according to the present invention, in which the numbered elements are as follows.

The coagulated fibers are then deposited on a net conveyor and subjected to water washing (removal of sulfuric acid) and drying. FIG. 3 illustrates one preferred embodiment of water washing and drying on the net conveyor. Referring to FIG. 3, an optically anisotropic dope of PPTA is extruded from a spinneret 2 into a non-coagulating layer 1a and then into a coagulating layer 1b. The solidified filament 3a is taken out from the coagulating layer 1b by a take-up roller 4 and is then caused to fall onto a turning conveyor 6 by a guiding roller 5. The guiding roller 5 has a cage-like appearance and is composed of a plurality of rods which constitute the filament-guiding periphery. Filaments 3b are piled on the conveyor 6 in the loosened state to form an endless narrow fleece, and they are transferred onto a treating conveyor 7 while being turned over. The treating conveyor 7 is moved continuously or intermittently by a suitable driving device at a velocity substantially equal to that of the turning conveyor 6. The fleece of piled loose filaments in the tension-free state is delivered to a washing device 8, a steam treating device 9, and a drying device 10 by the treating conveyor 7 and wound on a bobbin by a winding device 11. A cover belt 12 is disposed to prevent the filaments 3b piled in the tension-free state from being disturbed at the washing, steam-treating, and drying steps.

It is one of the indispensable requirements for realizing the fibers of the present invention having a specific fine-structure as described above that no substantial tension should be imposed on the fibers in the lengthwise direction throughout the water washing, steam-treatment, and drying steps. Accordingly, it is necessary to carefully handle the filaments in the coagulation layer, i.e., the step of taking out the filaments from the coagulating layer and depositing them on the net conveyor, and to use special devices so that the above-mentioned requirement is satisfied effectively. More specifically, when a tension is applied at these steps, orientation of polymer chains is excessively advanced in not only the crystalline region but also the amorphous region of the fiber, and it is considered that this excessive advance of orientation will result in degradation of the fatigue resistance when the fiber is used for reinforcing rubbers and the like.

Also at the step of taking out the filaments from the coagulating layer, it is important that no substantial tension should be imposed on the filaments. Accordingly, it is not preferred to dispose a direction-changing guide or the like in the coagulating layer. Therefore, it is preferred to adopt a method in which a funnel type spinning bath is used, as customarily used for spinning of cuprammonium rayon, and the fibers are taken out from the bath by the funnel as illustrated in FIG. 1 of Japanese Patent Publication No. 22204/69. A double-funnel type spinning bath as disclosed in Japanese Patent Application Laid-Open Specification No. 144911/78 is especially preferred.

Also when the filaments taken out from the coagulating layer are deposited on the net conveyor, stretching or tension treatment should not be performed, and it is necessary to minimize the direction-changing angle so that the tension imposed on the filaments by the resistance to take-out of the filaments from the coagulating layer or by the friction with guides and the like is maintained below about 0.2 g/d. Furthermore, careful attention should be paid to the material or surface roughness of the guides.

When the filaments on the net conveyor are washed with water in the absence of substantial tension to remove sulfuric acid therefrom, neutralization with aqueous alkali or application of an oiling agent may optionally be performed prior to or during water washing according to need. These treatments can be conducted according to the method disclosed in the non-heat-treatment process in U.S. Pat. No. 4,016,236.

The washed fibers are steam-treated and dried under specific temperature and time conditions while they are kept deposited on the net conveyor. To prepare fibers of the present invention which have a specific fine-structure giving high tenacity and high Young's modulus and exhibit excellent fatigue resistance when used for reinforcing rubbers and the like, the following two requirements are indispensable; more specifically, the fibers are treated with steam maintained at a temperature of at least 100° C. before drying while they are still deposited on the net conveyor and the fibers are then dried at a temperature of from 120° to 450° C. for a time satisfying the following conditions:

$$250 \leq (\text{temperature, °C.}) \times (\text{time, seconds})^{0.08} \leq 600.$$

It is not disclosed in any of the known references at all that washed fibers on the net conveyor are steam-treated prior to drying. The reason why this steam treatment is indispensable and significant for obtaining the intended fibers exerting an excellent fatigue resistance when used for reinforcing rubbers and the like is believed to be as follows:

By this steam treatment, there are attained an effect of inhibiting extreme reduction of the tenacity and increase of brittleness, which are caused at the drying step by excessive growth of crystal and excessive increase of the apparent crystallite size (ACS), and an effect of inhibiting reduction of the dimensional stability or stability of physical properties at high temperatures, which are caused by insufficient crystal growth and a very small ACS value. In short, an appropriate ACS providing fibers very suitable for reinforcing rubbers and the like is given to the fibers by the steam treatment. Secondarily, a specific fine-structure in which orientation of polymer chains is controlled at a very desirable level in not only the crystallite region but also the amorphous region can be imparted to fibers by the steam treatment. In other words, the central refractive index (Nvo) and tangential refractive indexes (TRIv and TRIp), which are parameters reflecting the fine-structure inclusive of the amorphous region, are controlled in specific ranges. More specifically, the degree of orientation of the polymer chains in the direction of the fiber axis in the amorphous region is relatively high in the central portion of the fiber, and the orientation degree of the axis corresponding to the crystallographic axis b in the radial direction of the fiber is relatively low. It is construed that molecules of water present in the amorphous region and maintained at high temperatures smoothen rearrangement and re-aggregation by thermal movements of the polymer chains, which will probably be generated during the steam-treating and drying steps. Thus, it is believed that this water exerts an effective function in producing a stable structure.

The treatment with saturated steam is carried out according to a method in which fibers deposited on the net conveyor are passed together with the net conveyor through a heating chamber filled with saturated steam. If the entrance opening of the heating chamber is communicated with open air through a narrow slit, the pressure of saturated steam is reduced to 0 kg/cm$^2$ G and the heating temperature is set at 100° C. When the entrance opening of the heating chamber is sealed from outer air by a roller seal or the like and the heat treatment is carried out under an elevated steam pressure, the heating temperature is preferably adjusted to a level of up to a temperature corresponding to a saturated steam pressure of about 4 kg/cm$^2$ G, that is, up to about 140° C. At too high a temperature, the operation risk is increased because the pressure resistance of the sealing portion is limited, and no particular advantage can be attained even if the temperature is elevated beyond the above-mentioned level.

It is important that the steam treatment should be conducted without substantial tension being applied to fibers deposited on the net conveyor. If a tension is applied, orientation of polymer chains in fibers becomes excessive, and the intended fibers of the present invention having an excellent fatigue resistance cannot be obtained at all.

The steam treatment time cannot easily be set, because it is influenced by such factors as the amount and temperature of steam, the monofilament denier and total denier of the fibers and the thickness of the fiber layer deposited on the net conveyor. Generally, the steam treatment time is set so that the washed fibers are substantially heated at a temperature of at least about 100° C. From this viewpoint and for economy, it is preferred that the steam treatment time be adjusted to 30 seconds to 30 minutes.

The steam-treated fibers are then dried under specific conditions. The method for transferring the fibers from the steam-treating step to the drying step is not particularly critical, as long as no substantial tension is imposed on the fibers. This transfer can be conveniently performed by using the same net conveyor. Reduction of the temperature of the fibers during the transfer may be allowed, but is not preferred from the economical viewpoint.

Drying is carried out at a temperature of from 120° to 450° C. for a time satisfying the following condition:

$$250 \leq (\text{temperature}) \times (\text{time})^{0.08} \leq 600$$

while keeping the fibers substantially stationary. In the above formula, the unit of the temperature is °C. and the time is expressed in seconds.

If the drying temperature is lower than 120° C., the drying should be conducted for an extremely long time so as to attain a sufficient drying effect. Elevation of the drying temperature is preferred in the point that the treatment time can be shortened. However, if the drying temperature is elevated, limitations of the heat resistance and durability are imposed on the materials of the net conveyor and the cover cloth disposed to prevent disturbance of accumulated fibers which are not yet deposited on the net conveyor and, moreover, loss of the heat energy becomes conspicuous. Therefore, the upper limit of the drying temperature is set at 450° C. It is preferred that the drying temperature be 140° to 300° C., particularly 140° to 250° C. To obtain the intended fibers of the present invention valuable for reinforcing rubbers and the like, it is important that the drying time should be set correlatively with the drying time.

If the drying or heating treatment is carried out according to the method generally disclosed in U.S. Pat. No. 4,016,236, fibers having sufficient physical properties and a special fine-structure suitable for reinforcing rubbers and the like cannot be obtained at all. In other words, to obtain fibers having a specific fine-structure defined in the present invention, it is indispensable that drying should be carried out under such conditions that the value of (temperature in °C.)×(time in seconds)$^{0.08}$ (hereinafter referred to as "drying factor value") is in the range of from 250 to 600 (°C.×sec.$^{0.08}$).

If the drying factor value is smaller than 250, presumably because of insufficient thermal setting of polymer chains, shrinkage of the dimension is caused when the fibers are kept in an atmosphere maintained at, for example, about 200° C. Furthermore, when the fibers are kept in such an atmosphere under slight tension, changes of physical proparties (such as reduction of elongation) are caused. This means that when the fibers are used for reinforcing rubbers, the fibers are detrimentally affected by post treatment (for example, application of an adhesive) or at the rubber-vulcanizing step. Therefore, such small drying factor value is not preferred from the practical viewpoint. The fibers dried under conditions giving a drying factor value smaller than 250 are lowly crystalline fibers having a fine-structure characterized in that the X-ray diffraction intensity ratio (RIX) is lower than 0.85 and the ACS (Å) value is smaller than 41+0.5 (orientation angle) which is derived from the above formula (8). When drying is carried out under conditions giving a drying factor value larger than 600, crystallization is excessively advanced to cause reduction of the tenacity and fatigue resistance. Fibers obtained under such drying conditions have a fine-structure characterized in that the RIX value is larger than 1.20 and the ACS (Å) value is larger than 80+0.5 (orientation angle) which is derived from the above formula (6). It is preferred that the drying factor value be in the range of from 280 to 550. By such drying treatment, there can be obtained fibers very useful for reinforcing rubbers and the like, which have fine-structure defined as preferred in the present invention.

The heating method adopted at the drying step is not particularly critical. There may be adopted a method in which heated air or nitrogen, combustion gas or other high temperature gas such as super-heated steam is blown on fibers deposited on the net conveyor or a method in which deposited fibers are heated by a hot plate or far infrared ray generator disposed above the net conveyor or above and below the net conveyor.

Drying is ordinarily conducted in one stage, or drying may be conducted in two or more stages by using the same or different temperatures. Since the additive rule is applicable to the drying factor value, if the drying operation is carried out in two or more stages, the drying conditions are adjusted so that the sum of the drying factor values at the respective stages is within the above-mentioned range.

It is possible to change the drying factor value correlatively with the temperature and time adopted at the steam treatment. However, it must be noted that the conditions of the steam treatment do not completely satisfy the temperature time relation requirement at the drying step, which is defined by the drying factor value.

At the drying step, application of substantial tension to the fibers should be avoided. If substantial tension is applied to the fibers at the drying step, orientation of polymer chains in the fibers is excessively advanced and the fatigue resistance is degraded.

The fibers which have been thus heat-treated in the absence of substantial tension under the above-mentioned specific conditions of the present invention are subjected to various post treatments such as application of a finishing oiling agent, adjustment of the moisture content, coloration for discrimination and interlacing treatment according to need, and they are wound. In practising the process of the present invention, no particular limitation is set for such post treatment or winding operation. Incidentally, application of an epoxy compound to the washed fibers prior to the steam treatment is not preferred, because no satisfactory effect is attained at the steam-treating step and the intended fibers of the present invention cannot be obtained.

The fibers of the present invention are prepared under specific conditions as described hereinbefore, and they are characterized by high tenacity and relatively high elongation, and they are excellent in dimensional stability and stability of physical properties at high temperature. Moreover, when the fibers of the present invention are used for reinforcing rubbers and the like, they show a very excellent fatigue resistance. Such superior physical properties of the fibers of the present invention are closely related to the specific fine-structure of the fibers, which specific fine-structure cannot be realized by any known conventional processes.

The fibers of the present invention are ordinarily used in the form of multifilaments when they are used for reinforcing rubbers and the like. Since fields of application of the fibers of the present invention are not limited to this use, they may be in the form of roving yarns, staple fibers, chopped strands, and the like.

The fibers of the present invention can be used especially effectively for reinforcing rubbers, particularly as tire cords for radial tires for heavy cars and reinforcing cords for rubber belts, such as V-belts, flat belts, and toothed belts. In this case, the highly improved fatigue resistance, that is, the characteristic of the present invention, can be exerted most effectively.

The fibers of the present invention retain excellent properties possessed by conventional PPTA fibers such as high tenacity, good dimensional stability, good heat resistance and high flame retardancy, and the fibers of the present invention can be applied to various uses to which conventional PPTA fibers have been applied.

Methods for determining the main parameters to be used for specifying the fine-structure of fibers and evaluating physical properties of fibers will now be described.

Method of Measurement of Inherent Viscosity

The inherent viscosity ($\eta$ inh) is defined by the equation:

$$\eta\ inh = (ln\cdot\eta rel)/C$$

and is measured at 30° C. with respect to a solution formed by dissolving the polymer or fiber at a concentration C of 0.5 g/dl, in concentrated sulfuric acid having a concentration of 98.5%, by weight, according to customary procedures.

Method of Measurement of Tenacity and Elongation of Fibers

The tensile strength, elongation, and Young's modulus of the filaments are measured according to customary procedures, as disclosed in U.S. Pat. No. 3,869,429, unless otherwise indicated.

Method of Measurement of Fatigue Resistance of Fibers

Various means for experimentally evaluating the fatigue resistance of fibers used as reinforcing fibers for rubber articles such as tires have been proposed in the art. In the present invention, there is adopted the tube fatigue resistance method A (Goodyear method) described in Reference 1-3-2-1 of "Chemical Fiber Tire Cord Test Methods" of Japanese Industrial Standard JIS-1017-1963. An adhesive-treated cord (treated cord) of a sample fiber is embedded in rubber so that the fiber axes are parallel. The resulting tubular test piece is bent by 105° (90° in the above Reference) and attached to a stretching-contraction fatigue tester. Then, an inner pressure of 3.5 kg/cm$^2$ G is applied to the test piece by using air, and the test piece is rotated at a rate of 850 rpm. Thus, the fatigue-resistant life of the tube is measured, and fibers of the present invention and comparative tubes are evaluated with respect to the fatigue resistance. The measurement was conducted on three test tubes with respect to each sample, and the fatigue-resistant life value is expressed by an average value.

The fatigue resistance of a fiber cord is remarkably changed according to the twist number of the cord. It is known that the fatigue resistance is improved as the twist number is increased, if the twist number is below a certain limit. In the case of a fiber having a low elongation, if the twist number of a cord is particularly increased, the ratio of the strength of the cord to the strength of the original filament (the strength utilization ratio) is reduced. Accordingly, in order to utilize the strength of the original filament effectively, it is not advantageous to increase the fatigue resistance by increasing the twist number. Also in this connection, the preferred characteristics of the fibers of the present invention are conveniently utilized, and this point should be taken into account in evaluating the fatigue resistance. In the present invention, the above-mentioned fatigue resistance test is carried out by using cords having the same twist structure. Two-ply yarns are used for formation of cords and the twist multiplier is adjusted to a constant value of 8.0. The twist multiplier is calculated according to the following equation:

twist multiplier = (twist number per meter) ×

$$\sqrt{\text{yarn denier}}/2870.$$

Treated cords to be subjected to the fatigue resistance test are prepared under the following same conditions. However, the preparation conditions adopted for formation of tire cords of the fibers of the present invention are, of course, not limited to those described below. These conditions may be changed and modified so as to utilize the characteristics of the fibers of the present invention effectively when they are actually used.

Cords are prepared by applying first and second twists so that the above-mentioned twist multiplier will be produced. Dipped cords are prepared according to a two-staged process in which an epoxy resin liquid composition is first applied and the epoxy resin applied cords are treated under a tension of 1 g/d at 250° C. and a resorcin-formalin latex is then applied and the latex-applied cords are treated under a tension of ⅓ g/d at 230° C.

The epoxy resin liquid composition used is a dispersion comprising the following components:

| Epikote 812 (epoxy resin manufactured by Shell Chemicals) | 3 parts by weight |
|---|---|
| Ethanol | 5 parts by weight |
| Polyvinylpyridine latex | 25 parts by weight |
| Water | 67 parts by weight |

The resorcin-formalin latex used comprises the following components:

| Resorcin | 11 parts by weight |
|---|---|
| Water | 238.4 parts by weight |
| 37% Formalin | 16.2 parts by weight |
| NaOH | 0.2 parts by weight |
| Polyvinylpyridine-styrene-butadiene latex (solid content = 41%) | 244 parts by weight |

This latex is used after it has been allowed to stand still overnight from the time of preparation.

The dipped cords are embedded in uncured rubber, and then the rubber is cured at 140° C. for 40 minutes. The rubber compound used has the following composition:

| Natural rubber | 90 parts by weight |
|---|---|
| Styrene-butadiene copolymer rubber | 10 parts by weight |
| Carbon black | 40 parts by weight |
| Stearic acid | 2 parts by weight |
| Petroleum softener | 10 parts by weight |
| Pine tar | 4 parts by weight |
| Zinc white | 5 parts by weight |
| N—Phenyl-β-naphthylamine | 1.5 parts by weight |
| 2-Benzothiazolyl disulfide | 0.75 parts by weight |
| Diphenyl guanidine | 0.75 parts by weight |
| Sulfur | 2.5 parts by weight |

Method of Measurement of Central Refractive Indexes (Nvo and Npo) and Tangential Refractive Indexes (TRIv and TRIp)

The specific molecular orientation in the fibers of the present invention will be apparent from the values of the central refractive indexes (Nvo and Npo) and tangential refractive indexes (TRIv and TRIp) obtained by using a transmission quantitative type interference microscope. Such specific molecular orientation leads to an excellent fatigue resistance.

According to the interference fringe method using a transmission quantitative type interference microscope (for example, an interference microscope, "Interphako", manufactured by Carl Zeiss Yena Co., East Germany), the distribution of the average refractive index, observed from the side face of the fiber, can be determined. This method can be applied to fibers having a circular cross-section.

The refractive index of fibers is characterized by a refractive index (Np) to polarized light vibrating in the direction parallel to the fiber axis and a refractive index (Nv) to polarized light vibrating in the direction perpendicular to the fiber axis. Refractive indexes (Np and Nv) obtained by using green rays (wavelength $\lambda=546$ $\mu$m) are employed. The measurement of Nv and determination of Nvo and TRIv will now be described in detail. Of course, the measurement of Np and the determination of Npo and TRIp can be performed according to similar procedures.

The fiber to be tested is immersed in a medium inert to fibers having a refractive index (Nr) giving a deviation of the interference fringe in the range of 0.2 to 2.0 times the wavelength by using optically flat slide glass and cover glass. The refractive index (Nr) of the medium is a value as measured at 20° C. by an Abbe refractometer using green rays (wavelength $\lambda=546$ $\mu$m). Several filaments are immersed in this medium so that the filaments are not in contact with one another. The fiber should be disposed so that the fiber axis is perpendicular to the optical axis of the interference microscope and the interference fringe. The pattern of the interference fringe is photographed and enlarged at 1500 to 2000 magnifications for analysis.

Figure 4A:
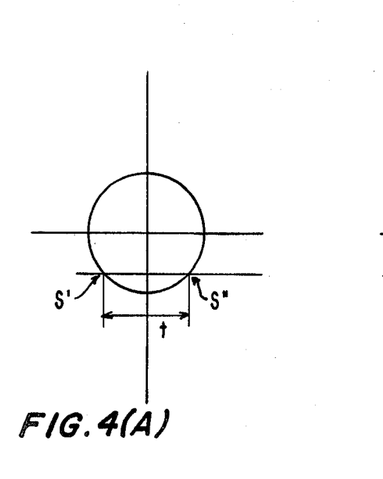
Figure 4B:
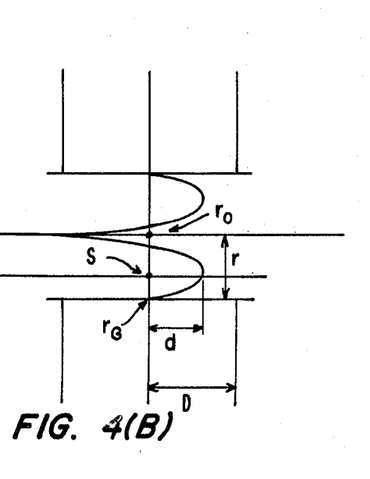

Referring to FIG. 4, the optical path difference R is represented by the following formula:

$$R=(d/D)\lambda=(Nv-Nr)t$$

wherein Nr stands for the refractive index of the medium, Nv is the average refractive index between filaments S'-S", $\lambda$ represents the wavelength of the rays used, D stands for the distance (corresponding to 1$\lambda$) between parallel interference fringes of the background, and d stands for a deviation of the interference fringe by the fiber.

From optical path differences at respective positions in the range of the center $r_o$ of the fiber to the periphery $r_G$ of the fiber, the distribution of the average refractive index (Nv) of the fiber at the respective positions can be determined.

The thickness t can be calculated based on the supposition that the fiber obtained has a circular cross-section. However, it is believed that sometimes, owing to changes of manufacturing conditions or accidents after the preparation, fibers have a non-circular cross-section. Accordingly, it is preferred that the measurement be conducted on a portion where the deviation of the interference fringe is symmetric with respect to the fiber axis. The measurement is performed in the range of the center ($r_o$) of the fiber to the position of 0.95 r from $r_o$ at intervals of 0.05 r, in which r represents the radius of the fiber, and thus, the average refractive index can be determined at each position. The central refractive index by polarized light vibrating in the direction perpendicular to the fiber axis is the value of the refractive index measured at the center of the fiber ($r_o$). The tangential refractive index TRIv by polarized light vibrating in the direction perpendicular to the fiber axis is represented by the equation:

$$TRiv = (Nv_{0.5} - Nvo)/0.5$$

wherein TRIv represents the tangent of the refractive index by polarized light vibrating in a direction perpendicular to the fiber axis, Nvo stands for the central refractive index and $Nv_{0.5}$ stands for the average refractive index at the position corresponding to 0.5 r from center of the fiber ($r_o$).

When the Np value is determined by using polarized light vibrating in the direction parallel to the fiber axis, the Npo value is given by the refractive index value measured at the center of the fiber ($r_o$) and the TRIp value can be calculated according to the following formula:

$$TRIp = (Np_{0.5} - Npo)/0.5$$

In determination of the tangential refractive index and central refractive index, the measurement is conducted on at least 3 filaments, preferably 5 to 10 filaments, and average values are calculated.

Results of the measurement of the Npo and TRIp values made on samples of fibers obtained in Examples 2 and 3 and Comparative Examples 6 and 7 are shown below.

| Sample | Npo | TRIp |
|---|---|---|
| Example 2-1 | 2.126 | −0.031 |
| Example 2-2 | 2.131 | −0.027 |
| Example 2-3 | 2.135 | −0.018 |
| Example 2-4 | 2.114 | −0.011 |
| Example 2-5 | 2.128 | −0.028 |
| Example 2-6 | 2.125 | −0.036 |
| Example 2-7 | 2.119 | −0.031 |
| Example 2-8 | 2.124 | −0.024 |
| Comparative Example 6-1 | 2.102 | −0.002 |
| Comparative Example 6-2 | 2.090 | −0.063 |
| Comparative Example 7 | 2.075 | −0.007 |
| Example 3-1 | 2.108 | −0.014 |
| Example 3-2 | 2.110 | −0.013 |
| Example 3-3 | 2.129 | −0.018 |
| Example 3-4 | 2.113 | −0.009 |

Method of Measurement of Orientation Angle (OA)

The orientation angle (OA) of the fiber is performed by using an X-ray generator (for example RU-200PL manufactured by Rigaku Denki), a fiber measuring device (FS-3 manufactured by Rigaku Denki), a goniometer (SG-9R manufactured by Rigaku Denki) and a scintillation counter. CuKα($\lambda = 1.5418$ Å) monochromatized by a nickel filter is used for the measurement.

Generally, the fibers of the present invention are characterized in that two major reflections appear on the equatorial line in the range of from 19° to 24° of $2\theta$. The reflection having a larger $2\theta$ value is used for the measurement of the orientation angle. The $2\theta$ value of the reflection used is determined from the curve of the diffraction intensity in the equatorial direction.

The X-ray generator is operated at 40 KV and 90 mA. The fiber sample is attached to the fiber measuring device to that monofilaments are parallel to one another. Preferably, the sample thickness is adjusted to about 0.5 mm. The goniometer is set at the $2\theta$ value determined by the preliminary test. The X-ray beam is applied in the direction vertical to the fiber axis of the filaments arranged in parallel to one another (vertical beam transmission method). Scanning is conducted in the range of from −30° to +30° in the azimuthal direction and the diffraction intensity is recorded by the scintillation counter. Furthermore, the diffraction intensity at −180° and the diffraction intensity at +180° are recorded. At this measurement, the scanning speed is 4°/min, the chart speed is 1.0 cm/min, the time constant is 2 or 5 seconds, the collimeter is characterized by 1 mm$\phi$, and the receiving slit angle is 1° in either the longitudinal direction or the lateral direction.

The orientation angle is determined from the obtained diffraction intensity curve according to the following procedure.

An average value of the diffraction intensity values obtained at ±180° is evaluated and a horizontal line is drawn to pass through the point of the average value. A perpendicular line is drawn to the base line from the peak, and the mid-point of the perpendicular line is determined and a horizontal line passing through the mid-point is drawn. The distance between intersecting points of this horizontal line and the diffraction intensity curve is measured and the measured value is converted to an angle in degrees. This half value width of angle is defined as the orientation angle (OA).

Method of Measurement of Apparent Crystallite Size (ACS) and Diffraction Intensity Ratio (RIX)

ACS and RIX can be measured by determining the curve of the diffraction intensity in the equatorial direction by the reflection method.

The measurement is carried out by using an X-ray generator (RU-200PL manufactured by Rigaku Denki), a goniometer (SG-9R manufactured by Rigaku Denki) and a scintillation counter. CuKα($\lambda = 1.5418$ Å) monochromatized by a nickel filter is used for the measurement. The fiber sample is set in a sample holder composed of aluminum so that the fiber axis is perpendicular to the plane of the $2\theta$ axis of the diffractionmeter. The thickness of the sample is adjusted to about 0.5 mm. The X-ray generator is operated at 40 KV and 90 mA. The diffraction intensity is recorded from 8° to 37° of $2\theta$ by using the scintillation counter at a scanning speed of $2\theta = 1°$/min, a chart speed of 1 cm/min and a time constant of 2 second with 1/6° divergent slit, a 0.3 mm receiving slit and 1/6° scattering slit. The full scale deflection of the recorder is set so that the entire diffraction curve remains on the scale and the maximum intensity value exceeds 50% of the full scale.

Generally, the fibers of the present invention are characterized in that they have two major reflections on the equatorial line in the range of from 19° to 24° of $2\theta$. ACS is determined with respect to the reflection of a smaller $2\theta$ value, and RIX is defined by the ratio of the diffraction intensity values of the 2 peaks.

A base line is established by drawing a straight line between 9° and 36° of $2\theta$ on the diffraction intensity curve. A vertical straight line is dropped from the diffraction peak, and the mid-point between the peak and the base line is marked. A horizontal line passing through the mid-point is drawn on the diffraction intensity curve. If the major reflections are sufficiently separated from each other, this line intersects shoulders of the two peaks of the curve, but if they are not sufficiently separated, the line intersects one shoulder alone.

The half value width of the peak is measured. If the line intersects one shoulder alone, the distance between the intersecting point and the mid-point is measured and doubled. If the line intersects two shoulders, the distance between the two shoulders is measured. The measured value is converted to a line breadth in radians (half value width) and the line breadth is corrected according to the following formula:

$$\beta = \sqrt{B^2 - b^2}$$

wherein B stands for the observed half value width, b is the broadening constant in radians, which is determined by measuring the half value width of a silicon single crystal at approximately $2\theta = 28°$, and $\beta$ designates the corrected half value width. The apparent crystallite size is given by the following formula:

$$ACS = K\lambda/\beta \cos\theta$$

wherein K is taken as one, $\lambda$ is the X-ray wavelength (1.5418 Å), $\beta$ is the corrected half value width, and $\theta$ is the Bragg angle.

RIX is defined by the ratio of the distance between the diffraction peak on the larger angle side in $2\theta$ and the base line to the distance between the diffraction peak on the smaller angle side and the base line.

Method of Measurement of Dynamic Mechanical Loss Tangent (tan δ)

The dynamic mechanical loss tangent can be measured by using commercially available apparatus, for example, Rheo-Vibron DDV-IIc manufactured by Toyo Baldwin. The dynamic mechanical loss tangent (tan δ) is measured at a frequency of 110 Hz in dry air at a temperature of 30° C. and a relative humidity of 60%.

The present invention will now be described in detail by reference to the following Examples. In these Examples, all "parts" and "%" are by weight, unless otherwise indicated.

REFERENCE EXAMPLE

A PPTA polymer was prepared in the following manner according to the low temperature solution polymerization method.

In a polymerization vessel disclosed in Japanese Patent Publication No. 43986/78, 70 parts of anhydrous calcium chloride was dissolved in 1000 parts of N-methylpyrrolidone, and 48.6 parts of p-phenylene diamine was then dissolved. The solution was cooled to 8° C. and 91.4 parts of the terephthaloyl dichloride in the powdery state was added to the solution at one time. In several minutes, the polymerization product was solidified to give a cheese-like product. The polymerization product was discharged from the polymerization vessel according to the method disclosed in Japanese Patent Publication No. 43986/78 and immediately transferred into a closed type biaxial kneader, and the polymerization product was finely pulverized in the kneader. Then, the pulverized polymerization product was transferred to a Henschel mixer and combined with water in an amount approximately equal to the amount of the pulverized polymerization product, and the mixture was pulverized, filtered, washed in warm water several times, and dried in hot air maintained at 110° C. to obtain 95 parts of a light yellow PPTA polymer having an inherent viscosity of 5.6 dl/g.

Polymers having a different inherent viscosity could easily be obtained by changing the ratio of N-methyl-pyrrolidone to the monomers (p-phenylenediamine and terephthaloyl dichloride) or the ratio of the two monomers.

EXAMPLE 1

The PPTA polymer having an inherent viscosity of 5.6 dl/g, which was prepared in Reference Example, was dissolved in sulfuric acid having a concentration of 99.4% at 70° C., over a period of 2 hours, so that the polymer concentration was 18%. The dissolution was carried out in vacuo, and the resulting dope was allowed to be kept stationary for 2 hours, so as to deaerate the dope. This dope was found to be anisotropic. The dope was extruded from a spinneret having 800 fine holes 0.06 mm in diameter. The extrudate was caused to run in air for 10 mm and was then coagulated in 25% dilute sulfuric acid maintained at 5° C. The resulting filament was taken out at a velocity of 120 m/min, and was then subjected to washing, steam treatment, and drying in the apparatus illustrated in FIG. 3. Washing was first conducted with a 15% aqueous solution of caustic soda and then with water. The steam treatment was accomplished by passing the net conveyor having the filaments deposited thereon through a heating chamber filled with saturated steam maintained at about 120° C. The entrance and exit openings of the heating chamber was sealed from outer air by roller seal. The residence time of the net conveyor in the heating chamber was adjusted to about 3 minutes. The steam-treated filaments deposited on the net conveyor were then taken out into open air and then dried on the net conveyor. Drying was performed in a hot current of nitrogen heated at 200° C. and the residence time was adjusted to 14 minutes. The drying factor value was 343. As the cover belt, there was used a plain-woven fabric of polytetrafluoroethylene capable of resisting the drying temperature. A stainless steel net was used as the net conveyor. The so obtained filament was a 1200-denier filament characterized by TRIv=0.045, TRIp=−0.016, Nvo=1.619, Npo=2.123, RIX=0.94, ACS=60 Å, OA=23°, and tan δ=0.021 and having a tenacity of 22.6 g/d, an elongation of 6.3%, and a Young's modulus of 360 g/d. The tube fatigue-resistant life as measured according to the above-mentioned method was 1480 minutes.

A filament was prepared in the same manner as described above except that the drying temperature was adjusted to 170° C. and the drying factor value was changed to 292. The obtained filament was characterized by TRIv=0.036, TRIp=0.013, Nvo=1.623, Npo=2.125, RIX=0.88, ACS=57 Å, OA=21°, and tan δ=0.022 and had a tenacity of 21.8 g/d, an elongation of 6.1%, and a Young's modulus of 330 g/d. The tube fatigue-resistant life was 1130 minutes. Also this fiber had a novel fine-structure and was excellent in fatigue resistance over fibers prepared by known processes described below.

COMPARATIVE EXAMPLE 1

For comparison, fibers were prepared according to the process disclosed in U.S. Pat. No. 3,869,429.

A filament spun in the same manner as described in Example 1 was wound on a bobbin without using the apparatus of the present invention shown in FIG. 3. In the wound state, the filament was washed with a 10% aqueous solution of caustic soda and immersed in a washing tank filled with water to effect water washing. Then, while the filament was kept wound on the bobbin, the filament was dried in a hot air drier maintained at 160° C.

The obtained filament was characterized by TRIv=0.052, TRIp=+0.003, Nvo=1.596, Npo=2.092, RIX=0.81, ACS=43 Å, and OA=15°. The filament had a fine-structure quite different from that of the filament of the present invention obtained in Example 1 except the TRIv value. The filament had a tenacity of 19.5 g/d, an elongation of 3.9% and a Young's modulus of 560 g/d, and the tube fatigue-resistant life was 280 minutes. The tenacity and elongation of this filament were slightly lower than those of Example 1, the Young's modulus of the filament was higher than that of Example 1, and fatigue resistance of the filament was much lower than that of Example 1.

The operations of up to the washing step were conducted in the same manner as described in Example 1, and the washed filament was dried on a heating roller maintained at 160° C.

The obtained filament was characterized by TRIv=0.053, TRIp=−0.001, Nvo=1.603, Npo=2.098, RIX=0.83, ACS=40 Å, and OA=17° and had a tenacity of 19.6 g/d, an elongation of 4.1%, and a Young's modulus of 530 g/d. The tube fatigue-resistant life was 330 minutes. The filament was much inferior to the filament of Example 1 in the fatigue resistance.

COMPARATIVE EXAMPLE 2

For comparison, fibers were prepared according to the process disclosed in the non-heat-treatment process in U.S. Pat. No. 4,016,236.

In the same manner as described in Example 1, a filament was spun and washed by using the apparatus shown in FIG. 3. The washed filament was passed through the steam-treating chamber to which the supply of saturated steam was completely stopped. The temperature of the steam-treating chamber was room temperature. Then the filament was dried at 170° C. for 14 minutes.

The obtained filament was characterized by TRIv=0.027, TRIp=0, Nvo=1.617, Npo=2.101, RIX=0.80, ACS=49 Å, and OA=27° and had a tenacity of 21.6 g/d, and elongation of 6.4%, and a Young's modulus of 310 g/d. The tube fatigue-resistant life was 610 minutes.

The fiber was much inferior to the fiber of Example 1 in the fatigue resistance, that is, the fatigue resistance of the filament was ½ or less of the fatigue resistance of the filament of Example 1, though the tube fatigue-resistant life was relatively longer than that of the filament of Comparative Example 1.

It was found that the fiber of this Comparative Example was very poor in dimensional stability and the stability of physical properties at high temperatures. When the fiber of this comparative example and the fiber of example 1 was allowed to stand still in the absence of tension for 30 minutes in an oven maintained at 200° C., a dimensional shrinkage of 0.08 to 0.11% (three samples) was caused in the former fiber but no shrinkage was caused in the latter fiber.

Further, when the two fibers were treated under a tension of 0.5 g/d for 30 minutes in an oven maintained at 220° C., the following changes of physical properties were observed:

Fiber of Example 1 Dried at 170° C.:

|  | Tenacity (g/d) | Elongation (%) | Young's Modulus (g/d) |
|---|---|---|---|
| before treatment | 21.8 | 6.1 | 330 |
| after treatment | 21.9 | 5.9 | 350 |

Fiber of This Comparative Example:

|  | Tenacity (g/d) | Elongation (%) | Young's Modulus (g/d) |
|---|---|---|---|
| before treatment | 21.6 | 6.4 | 310 |
| after treatment | 21.8 | 3.5 | 640. |

From the foregoing results, it is seen that when the fiber of Example 1 according to the present invention was exposed to a low tension at high temperatures, the physical properties were not substantially changed, whereas significant changes of physical properties were caused in the fiber of this Comparative Example prepared according to the process disclosed in the non-heat-treatment process in U.S. Pat. No. 4,016,236.

COMPARATIVE EXAMPLE 3

For comparison, PPTA fibers were prepared according to the process disclosed in the heat-treatment process in U.S. Pat. No. 4,016,236.

The apparatus shown in FIG. 3 was partially modified, and by using the modified apparatus, the process disclosed in the heat-treatment process in U.S. Pat. No. 4,016,236 was traced.

The filament coagulated and washed in the same manner as described in Example 1 was dried by hot air maintained at 120° C. while the filament was deposited on the net conveyor. Then the filament was heat-treated by a hot plate maintained at 250° C. The drying operation was conducted for 5 minutes and the heat treatment was conducted for 10 or 30 seconds.

The obtained filament heat-treated for 10 seconds was characterized by TRIv=0.051, TRIp=−0.002, Nvo=1.612, Npo=2.098, RIX=0.83, ACS=50 Å, and OA=25° and had a tenacity of 22.5 g/d, an elongation of 5.9%, and a Young's modulus of 380 g/d. The tube fatigue-resistant life was 620 minutes.

The obtained filament heat-treated for 30 seconds was characterized by TRIv=0.086, TRIp=−0.057, Nvo=1.617, Npo=2.129, RIX=1.21, ACS=96 Å, and OA=19° and had a tenacity of 16.6 g/d, an elongation of 3.8%, and a Young's modulus of 510 g/d. The tube fatigue-resistant life was 220 minutes.

As pointed out hereinbefore, the additive rule can be applied to the drying factor value. Accordingly, the drying and heat treatment steps are regarded as two drying steps in the two-staged drying method, and the drying factor value is calculated by addition. It is seen that the drying factor value in the case of 10 seconds' heat treatment is 490 and the drying factor value in the case of 30 seconds' heat treatment is 518. Although these drying factor values are included in the range specified in the present invention and these two values are relatively close to each other, in one fiber no substantial crystal growth is caused while in the other fiber crystal growth is excessive. This is due to the fact that the steam treatment is not conducted prior to drying.

COMPARATIVE EXAMPLE 4

The fiber obtained in Example 1 was subjected to heat treatment under tension.

A part of the fiber prepared in Example 1 by conducting drying at 200° C. was treated under a tension of about 5 g/d in a nitrogen atmosphere heated at 300° C. The tension was set by controlling the speed ratio of the feed roller and winding roller. The residence time was adjusted to about 4 seconds.

The obtained filament was characterized by $TRIv=0.068$, $TRIp=+0.001$, $Nvo=1.611$, $Npo=2.130$, $RIX=1.10$, $ACS=74$ Å, and $OA=14°$ and had a tenacity of 21.3 g/d, an elongation of 1.9%, and a Young's modulus of 720 g/d. The tube fatigue-resistant life was 160 minutes.

In this fiber, since orientation was excessively advanced, a high Young's modulus was attained, but the tube fatigue-resistant life was extremely shortened. Accordingly, the fiber should be used in an application field not intended in the present invention.

COMPARATIVE EXAMPLE 5

An isotropic dope having a polymer concentration of 4.5% was prepared by using PPTA polymer prepared in the same manner as described in the Reference Example, and a filament was prepared from this dope under the same conditions as described in Example 1.

The obtained fiber was characterized by $TRIv=0.014$, $TRIp=+0.002$, $Nvo=1.627$, $Npo=2.010$, $RIX=0.83$, $ACS=55$ Å, and $OA=32°$ and had a tenacity of 10.6 g/d, an elongation of 7.3%, and a Young's modulus of 210 g/d. Both the tenacity and the Young's modulus were low. The reason for this is believed to be that the degree of orientation of polymer chains in either the crystalline region or the amorphous region was too low.

EXAMPLE 2 AND COMPARATIVE EXAMPLE 6

A PPTA polymer having an inherent viscosity of 6.1 dl/g, which was prepared according to the method described in the Reference Example, was dissolved in sulfuric acid having a concentration of 99.4% at 65° C. over a period of 2 hours so that the polymer concentration was 16%. Then deaeration was conducted to obtain an anisotropic dope. In the same manner as described in Example 1, the dope was extruded in air, coagulated by passing the extrudate through a so-called double funnel type spinning bath disclosed in Japanese Patent Application Laid-Open Specification No. 144911/78, and then washed. The drying conditions and the conditions of the steam treatment were changed to obtain various filaments. The preparation conditions and results are indicated in Table 1. All the filaments mentioned in Table 1 were found to have an inherent viscosity of 5.8 to 6.0 dl/g and a monofilament denier of about 2.0.

EXAMPLE 3 AND COMPARATIVE EXAMPLE 7

Various dopes differing in polymer concentration were prepared by using a PPTA polymer having an inherent viscosity of 6.2 dl/g, which was prepared according to the method described in the Reference Example. The dope temperature was adjusted according to the polymer concentration as indicated in Table 2. Each dope was found to be anisotropic. Filaments having a monofilament denier indicated in Table 2 were prepared while adjusting the draft at the spinning step. Drying was carried out at 200° C. for 14 minutes. Conditions other than those specially mentioned were the same as in Example 1. The preparation conditions and results are indicated in Table 2.

It will be apparent to those skilled in the art that various modifications and variations could be made in the fiber and process of the invention without departing from the scope or spirit of the invention.

TABLE 1

| | Preparation Conditions | | | | Results | | | | | | | | | |
|---|---|---|---|---|---|---|---|---|---|---|---|---|---|---|
| | Steam Treatment | | | | | | | | | | Physical Properties of Fiber | | | |
| Sample No. | Temperature (°C.) | Time (min.) | Temperature (°C.) | Drying Time (min.) | Drying Factor Value | Fine-structure of Fiber | | | | | | Tenacity | Elongation (%) | Young's Modulus (g/d) | Tube fatigue-resistant life (mins.) |
| | | | | | | TRIv | Nvo | RIX | ACS | OA | tan δ | | | | |
| 2-1 | 100 | 10 | 220 | 12 | 372 | 0.033 | 1.623 | 0.89 | 62 Å | 21° | 0.016 | 20.8 | 6.7 | 300 | 1320 |
| 2-2 | 100 | 25 | 220 | 0.5 | 289 | 0.028 | 1.615 | 0.86 | 54 Å | 22° | 0.019 | 21.2 | 6.8 | 290 | 960 |
| 2-3 | 110 | 10 | 140 | 25 | 251 | 0.021 | 1.616 | 0.86 | 52 Å | 19° | 0.025 | 21.3 | 6.5 | 330 | 840 |
| 2-4 | 140 | 5 | 180 | 10 | 300 | 0.026 | 1.620 | 0.91 | 58 Å | 23° | 0.019 | 21.5 | 6.8 | 300 | 1150 |
| 2-5 | 110 | 5 | 200 | 60 | 385 | 0.030 | 1.621 | 0.98 | 65 Å | 20° | 0.018 | 20.5 | 6.6 | 320 | 1090 |
| 2-6 | 110 | 5 | 250 | 20 | 441 | 0.045 | 1.614 | 1.03 | 75 Å | 23° | 0.018 | 20.1 | 6.1 | 340 | 890 |
| 2-7 | 110 | 5 | 300 | 0.1 | 341 | 0.028 | 1.617 | 0.92 | 68 Å | 20° | 0.021 | 20.6 | 6.2 | 310 | 1010 |
| 2-8 | 110 | 1 | 400 | 0.2 | 488 | 0.054 | 1.620 | 1.00 | 71 Å | 21° | 0.019 | 19.9 | 6.0 | 350 | 920 |
| C6-1 | 110 | 5 | 110 | 20 | 194 | 0.022 | 1.619 | 0.77 | 47 Å | 21° | 0.025 | 20.7 | 6.8 | 270 | 620 |
| C6-2 | 110 | 5 | 500 | 0.25 | 621 | 0.091 | 1.621 | 1.24 | 101 Å | 22° | 0.016 | 14.7 | 3.9 | 380 | 110 |

Note:
Samples 2-1 through 2-8 are fibers according to the present invention and samples C6-1 and C6-2 are comparative fiber outside the scope of the present invention.

TABLE 2

| | Dope Conditions | | | Fine-structure and Physical Properties of Fiber | | | | | | | | | Tube fatigue-resistant life (minutes) |
|---|---|---|---|---|---|---|---|---|---|---|---|---|---|
| Sample | Polymer Concentration (%) | Temperature (°C.) | Monofilament Denier | TRIv | Nvo | RIX | ACS (Å) | OA | tan δ | tenacity (g/d) | Elongation (%) | Young's modulus (g/d) | |
| Comparative Example 7 | 10 | 30 | 2.0 | 0.016 | 1.626 | 0.75 | 49 | 28° | 0.028 | 12.5 | 7.1 | 240 | 570 |
| Example 3-1 | 12 | 45 | 2.0 | 0.020 | 1.624 | 0.89 | 58 | 26° | 0.026 | 17.8 | 6.9 | 260 | 1,050 |
| Example | 14 | 55 | 2.0 | 0.021 | 1.625 | 0.88 | 60 | 25° | 0.027 | 19.5 | 6.7 | 290 | 1,100 |

TABLE 2-continued

| Sample | Dope Conditions Polymer Concentration (%) | Temperature (°C.) | Fine-structure and Physical Properties of Fiber Monofilament Denier | TRIv | Nvo | RIX | ACS (Å) | OA | tan δ | tenacity (g/d) | Elongation (%) | Young's modulus (g/d) | Tube fatigue-resistant life (minutes) |
|---|---|---|---|---|---|---|---|---|---|---|---|---|---|
| 3-2 | | | | | | | | | | | | | |
| Example 3-3 | 20 | 85 | 2.5 | 0.040 | 1.611 | 0.93 | 61 | 20° | 0.019 | 20.3 | 6.0 | 480 | 910 |
| Example 3-4 | 20 | 85 | 3.5 | 0.025 | 1.616 | 0.90 | 57 | 22° | 0.020 | 19.1 | 6.2 | 410 | 790 |

What is claimed is:

1. A fiber excellent in fatigue resistance, consisting essentially of poly-p-phenylene-terephthalamide, wherein the tangential refractive index (TRIv) of the fiber by polarized light vibrating in the direction perpendicular to the fiber axis is in the range of from 0 to 0.07, the tangential refractive index (TRIp) of the fiber by polarized light vibrating in the direction parallel to the fiber axis is in the range of from −0.06 to −0.005, the central refractive index (Nvo) of the fiber by polarized light vibrating in the direction perpendicular to the fiber axis and the X-ray diffraction intensity ratio (RIX) are in the range satisfying the conditions of the formulae (1) through (4):

$$Nvo \geq -0.08(RIX) + 1.672 \tag{1}$$

$$Nvo \leq 1.700 \tag{2}$$

$$RIX \geq 0.85 \tag{3}$$

$$RIX \leq 1.20 \tag{4}$$

and the apparent crystallite size (ACS in Å) of the fiber and the orientation angle (OA in degrees) of the fiber are in the range circumscribed by the four lines (a), (b), (c), and (d) defined by the formulae (5) through (8) as illustrated in FIG. 1:

$$OA \geq 0.04(ACS) + 16 \tag{5}$$

$$OA \geq 2(ACS) - 160 \tag{6}$$

$$OA \leq 0.04(ACS) + 26 \tag{7}$$

$$OA \leq 2(ACS) - 82 \tag{8}$$

2. The fiber according to claim 1, wherein the dynamic mechanical loss tangent (tan δ) is in the range of from 0.001 to 0.030.

3. The fiber according to claim 1, wherein the inherent viscosity is at least 5.0 dl/g, as measured at a concentration of 0.5 g of polymer in 1 dl of sulfuric acid having a concentration of 98.5%, by weight, at 30° C.

4. The fiber according to claim 1, wherein the tangential refractive index (TRIv) of the fiber is in the range of from 0.02 to 0.06 and the tangential refractive index (TRIp) of the fiber is in the range of from −0.040 to −0.010.

5. The fiber according to claim 1, wherein the central refractive index (Nvo) of the fiber is in the range of from 1.605 to 1.630.

6. The fiber according to claim 1 or 5, wherein the X-ray diffraction intensity ratio (RIX) is 1.05 or less.

7. The fiber according to claim 1, wherein the orientation angle is at least 20°.

8. The fiber according to claim 1 or 7, wherein the relation between the orientation angle (OA in degrees) and the apparent crystalline size (ACS in Å) is defined by the formula:

$$2(ACS) - 140 \leq OA \leq 2(ACS) - 86.$$

9. The fiber according to claim 1 wherein the monofilament denier is less than 3.0.

* * * * *